US012576856B2

(12) United States Patent
Schmitt et al.

(10) Patent No.: US 12,576,856 B2
(45) Date of Patent: Mar. 17, 2026

(54) INFERRING OPERATOR CHARACTERISTICS FROM DEVICE MOTION DATA

(71) Applicant: Caret Holdings, Inc., Columbus, OH (US)

(72) Inventors: Kyle Patrick Schmitt, Chicago, IL (US); Cheng Li, Fremont, CA (US); Evan Michael Byrne, Columbus, OH (US); Scott David Huber, Columbus, OH (US); Kyle Jacob Parsons, Philadelphia, PA (US)

(73) Assignee: CARET HOLDINGS, INC., Columbus, OH (US)

( * ) Notice: Subject to any disclaimer, the term of this patent is extended or adjusted under 35 U.S.C. 154(b) by 271 days.

(21) Appl. No.: 17/929,552

(22) Filed: Sep. 2, 2022

(65) Prior Publication Data

US 2024/0075939 A1 Mar. 7, 2024

(51) Int. Cl.
B60W 40/09 (2012.01)
(52) U.S. Cl.
CPC ......... B60W 40/09 (2013.01); B60W 2510/18 (2013.01); B60W 2520/105 (2013.01)
(58) Field of Classification Search
CPC ............. B60W 40/09; B60W 2510/18; B60W 2520/105; B60W 2520/125; B60W 2556/10
See application file for complete search history.

(56) References Cited

U.S. PATENT DOCUMENTS

| | | | | |
|---|---|---|---|---|
| 11,353,335 B1* | 6/2022 | Brandmaier | ........... | G01C 21/20 |
| 2011/0213628 A1* | 9/2011 | Peak | ....................... | G06Q 40/08 |
| | | | | 705/4 |
| 2015/0168174 A1* | 6/2015 | Abramson | ......... | G01C 21/3484 |
| | | | | 701/408 |
| 2017/0057518 A1* | 3/2017 | Finegold | ............... | H04M 1/725 |
| 2019/0005812 A1* | 1/2019 | Matus | .................. | G06V 20/584 |
| 2019/0220028 A1* | 7/2019 | Anderson | .............. | G06N 5/022 |
| 2019/0228645 A1* | 7/2019 | Sumers | ................. | G06F 18/256 |
| 2019/0287180 A1* | 9/2019 | Vartanian | ............... | G07C 5/008 |
| 2021/0107495 A1* | 4/2021 | Meng | ..................... | B60W 40/09 |
| 2022/0153300 A1* | 5/2022 | Kwatra | ............. | G01C 21/3484 |
| 2022/0381564 A1* | 12/2022 | Kitchen | ................. | G07C 5/008 |

(Continued)

*Primary Examiner* — James J Lee
*Assistant Examiner* — Melanie G Huber
(74) *Attorney, Agent, or Firm* — SCHWEGMAN LUNDBERG & WOESSNER, P.A.

(57) ABSTRACT

Raw sensor data from a device of a user is collected. The raw data does not include location data for the device. The data is preprocessed to identify driving trips in which the user had the device. The trip data is provided to machine-learning models (MLMs) as input and the MLMs provide as output predictions for each trip's estimated speeds, estimated number of hard brakes and a degree of each hard brake, and estimated degrees of distracted driving. A duration, time of day, and calendar date of each trip is identified. The predictions, duration, time of day, and calendar date are modified into four factor values. The four modified factor values are combined into an overall driver characteristic value and provided to a network service associated with the user for purposes of providing or modifying services provided to the user through the network service based on the overall characteristic value.

18 Claims, 3 Drawing Sheets

(56) References Cited

U.S. PATENT DOCUMENTS

| 2022/0414495 | A1* | 12/2022 | Stanevich | G06Q 40/08 |
| 2023/0166743 | A1* | 6/2023 | Heck | G06N 3/044 |
| 2023/0304810 | A1* | 9/2023 | Zhu | G01C 21/3469 |

* cited by examiner

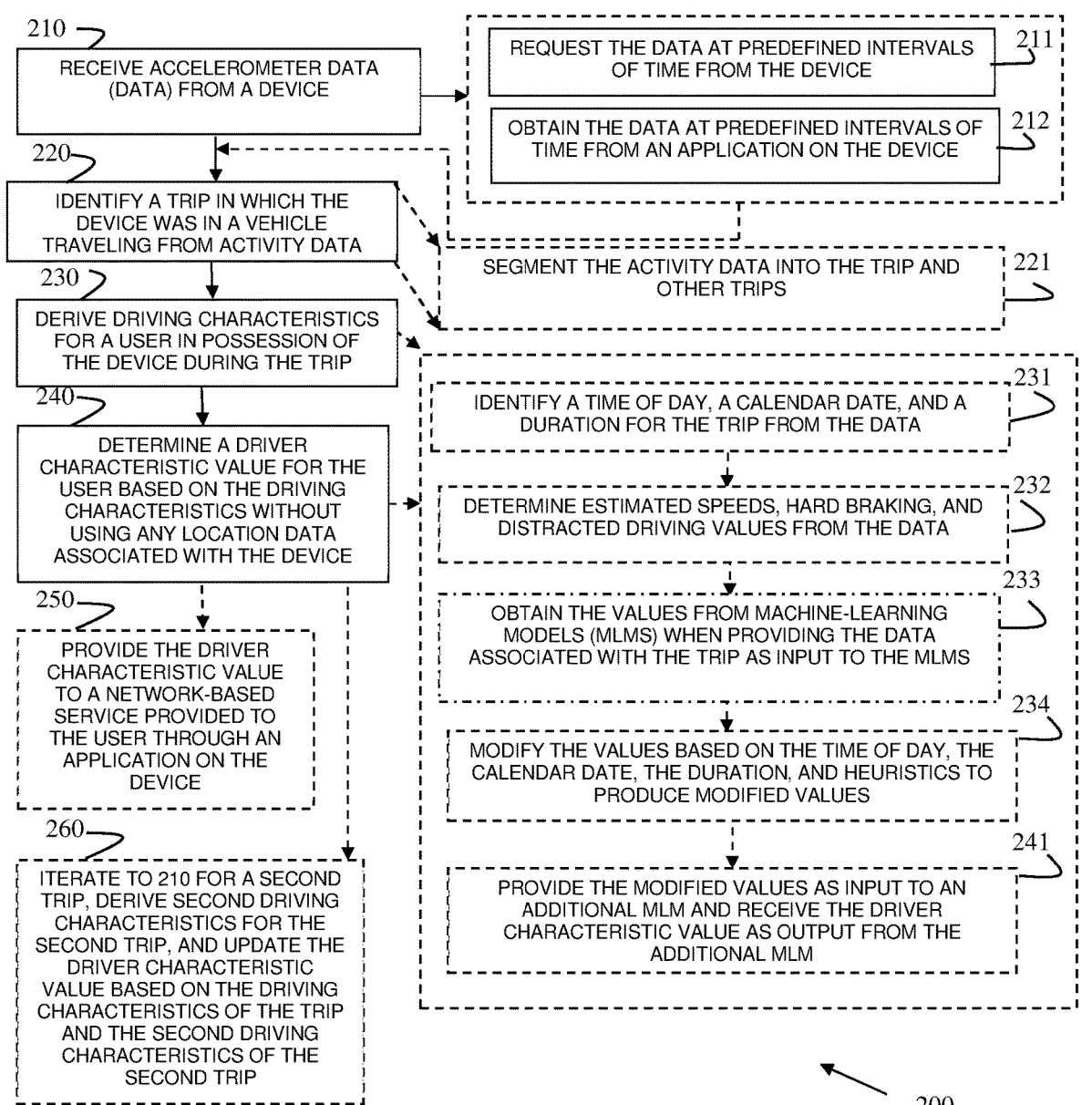

210
RECEIVE ACCELEROMETER DATA
(DATA) FROM A DEVICE

211
REQUEST THE DATA AT PREDEFINED INTERVALS
OF TIME FROM THE DEVICE

212
OBTAIN THE DATA AT PREDEFINED INTERVALS OF
TIME FROM AN APPLICATION ON THE DEVICE

220
IDENTIFY A TRIP IN WHICH THE
DEVICE WAS IN A VEHICLE
TRAVELING FROM ACTIVITY DATA

221
SEGMENT THE ACTIVITY DATA INTO THE TRIP AND
OTHER TRIPS

230
DERIVE DRIVING CHARACTERISTICS
FOR A USER IN POSSESSION OF
THE DEVICE DURING THE TRIP

231
IDENTIFY A TIME OF DAY, A CALENDAR DATE, AND A
DURATION FOR THE TRIP FROM THE DATA

240
DETERMINE A DRIVER
CHARACTERISTIC VALUE FOR THE
USER BASED ON THE DRIVING
CHARACTERISTICS WITHOUT
USING ANY LOCATION DATA
ASSOCIATED WITH THE DEVICE

232
DETERMINE ESTIMATED SPEEDS, HARD BRAKING, AND
DISTRACTED DRIVING VALUES FROM THE DATA

233
OBTAIN THE VALUES FROM MACHINE-LEARNING
MODELS (MLMS) WHEN PROVIDING THE DATA
ASSOCIATED WITH THE TRIP AS INPUT TO THE MLMS

250
PROVIDE THE DRIVER
CHARACTERISTIC VALUE
TO A NETWORK-BASED
SERVICE PROVIDED TO
THE USER THROUGH AN
APPLICATION ON THE
DEVICE

234
MODIFY THE VALUES BASED ON THE TIME OF DAY, THE
CALENDAR DATE, THE DURATION, AND HEURISTICS TO
PRODUCE MODIFIED VALUES

260
ITERATE TO 210 FOR A SECOND
TRIP, DERIVE SECOND DRIVING
CHARACTERISTICS FOR THE
SECOND TRIP, AND UPDATE THE
DRIVER CHARACTERISTIC
VALUE BASED ON THE DRIVING
CHARACTERISTICS OF THE TRIP
AND THE SECOND DRIVING
CHARACTERISTICS OF THE
SECOND TRIP

241
PROVIDE THE MODIFIED VALUES AS INPUT TO AN
ADDITIONAL MLM AND RECEIVE THE DRIVER
CHARACTERISTIC VALUE AS OUTPUT FROM THE
ADDITIONAL MLM

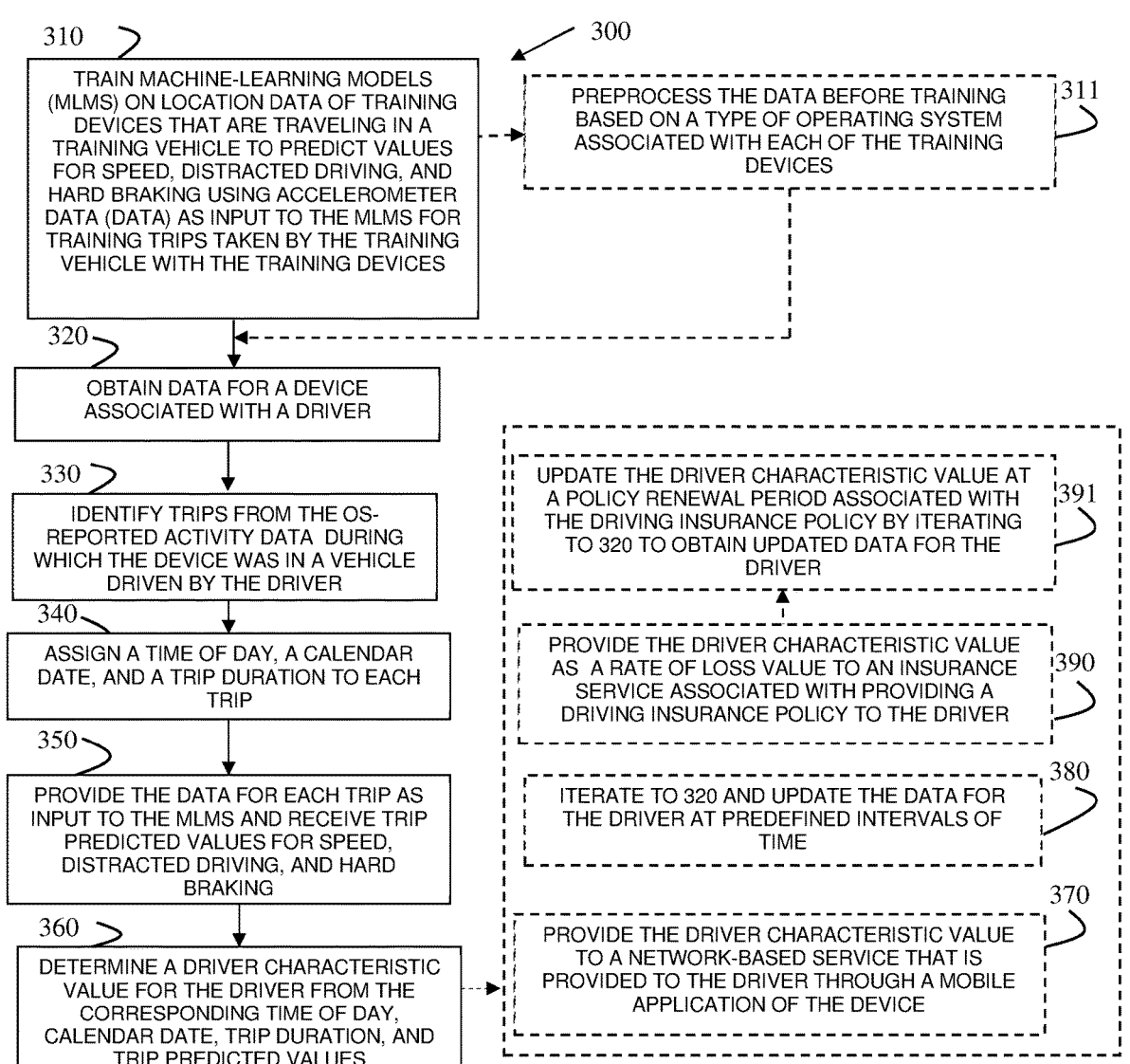

310

TRAIN MACHINE-LEARNING MODELS (MLMS) ON LOCATION DATA OF TRAINING DEVICES THAT ARE TRAVELING IN A TRAINING VEHICLE TO PREDICT VALUES FOR SPEED, DISTRACTED DRIVING, AND HARD BRAKING USING ACCELEROMETER DATA (DATA) AS INPUT TO THE MLMS FOR TRAINING TRIPS TAKEN BY THE TRAINING VEHICLE WITH THE TRAINING DEVICES

300

PREPROCESS THE DATA BEFORE TRAINING BASED ON A TYPE OF OPERATING SYSTEM ASSOCIATED WITH EACH OF THE TRAINING DEVICES

311

320

OBTAIN DATA FOR A DEVICE ASSOCIATED WITH A DRIVER

330

IDENTIFY TRIPS FROM THE OS-REPORTED ACTIVITY DATA DURING WHICH THE DEVICE WAS IN A VEHICLE DRIVEN BY THE DRIVER

340

ASSIGN A TIME OF DAY, A CALENDAR DATE, AND A TRIP DURATION TO EACH TRIP

350

PROVIDE THE DATA FOR EACH TRIP AS INPUT TO THE MLMS AND RECEIVE TRIP PREDICTED VALUES FOR SPEED, DISTRACTED DRIVING, AND HARD BRAKING

360

DETERMINE A DRIVER CHARACTERISTIC VALUE FOR THE DRIVER FROM THE CORRESPONDING TIME OF DAY, CALENDAR DATE, TRIP DURATION, AND TRIP PREDICTED VALUES

UPDATE THE DRIVER CHARACTERISTIC VALUE AT A POLICY RENEWAL PERIOD ASSOCIATED WITH THE DRIVING INSURANCE POLICY BY ITERATING TO 320 TO OBTAIN UPDATED DATA FOR THE DRIVER

391

PROVIDE THE DRIVER CHARACTERISTIC VALUE AS A RATE OF LOSS VALUE TO AN INSURANCE SERVICE ASSOCIATED WITH PROVIDING A DRIVING INSURANCE POLICY TO THE DRIVER

390

ITERATE TO 320 AND UPDATE THE DATA FOR THE DRIVER AT PREDEFINED INTERVALS OF TIME

380

PROVIDE THE DRIVER CHARACTERISTIC VALUE TO A NETWORK-BASED SERVICE THAT IS PROVIDED TO THE DRIVER THROUGH A MOBILE APPLICATION OF THE DEVICE

INFERRING OPERATOR CHARACTERISTICS FROM DEVICE MOTION DATA

BACKGROUND

Increasingly, enterprises and web-based services rely on location data reported from users' mobile devices. Location data is used to push advertisements to users, provide directions to users, activate offers for users, provide the users access to resources, display custom location-based information to the users, and the like.

However, governments and device manufactures (or Operating System (OS) distributors) are severely cracking down on the use of location data out of consumer privacy concerns. Justifiably consumers are concerned how this data is being used to track them, profile them, and harass them with marketing material. The enterprises often force consumers to consent to provide access to the consumers' location data in order to have access to a full suite of resources offered by the enterprises. Initially, consumers just checked the consent box and permitted use of their location data but as the consumers became more and more inundated by popup notifications, emails, and text messages they have increasingly stopped providing their consent.

OS distributors are now making it harder for enterprises to obtain consumer consent. In fact, some distributors by default do not provide location data of the consumer to enterprises and will often periodically notify the consumer that a specific application of an enterprise is tracking the location of the consumer while providing the consumer an option to turn it off or curtail the location sharing to only when the consumer is using the application.

Furthermore, governments have started passing laws or issuing regulations regarding the collection and use of location data. Some governments are more restrictive than others, which makes compliance difficult and expensive for the enterprises to continue to rely on consumer location data.

As a result, enterprises are finding it much more difficult to obtain their customers' location data. Furthermore, some enterprises are attempting to remove or mitigate their reliance on consumer location data.

BRIEF DESCRIPTION OF THE DRAWINGS

FIG. 2 is a diagram of a method for inferring operator characteristics based on device motion data, according to an example embodiment.

FIG. 3 is a diagram of another method for inferring operator characteristics based on device motion data, according to an example embodiment.

DETAILED DESCRIPTION

Figure 1:
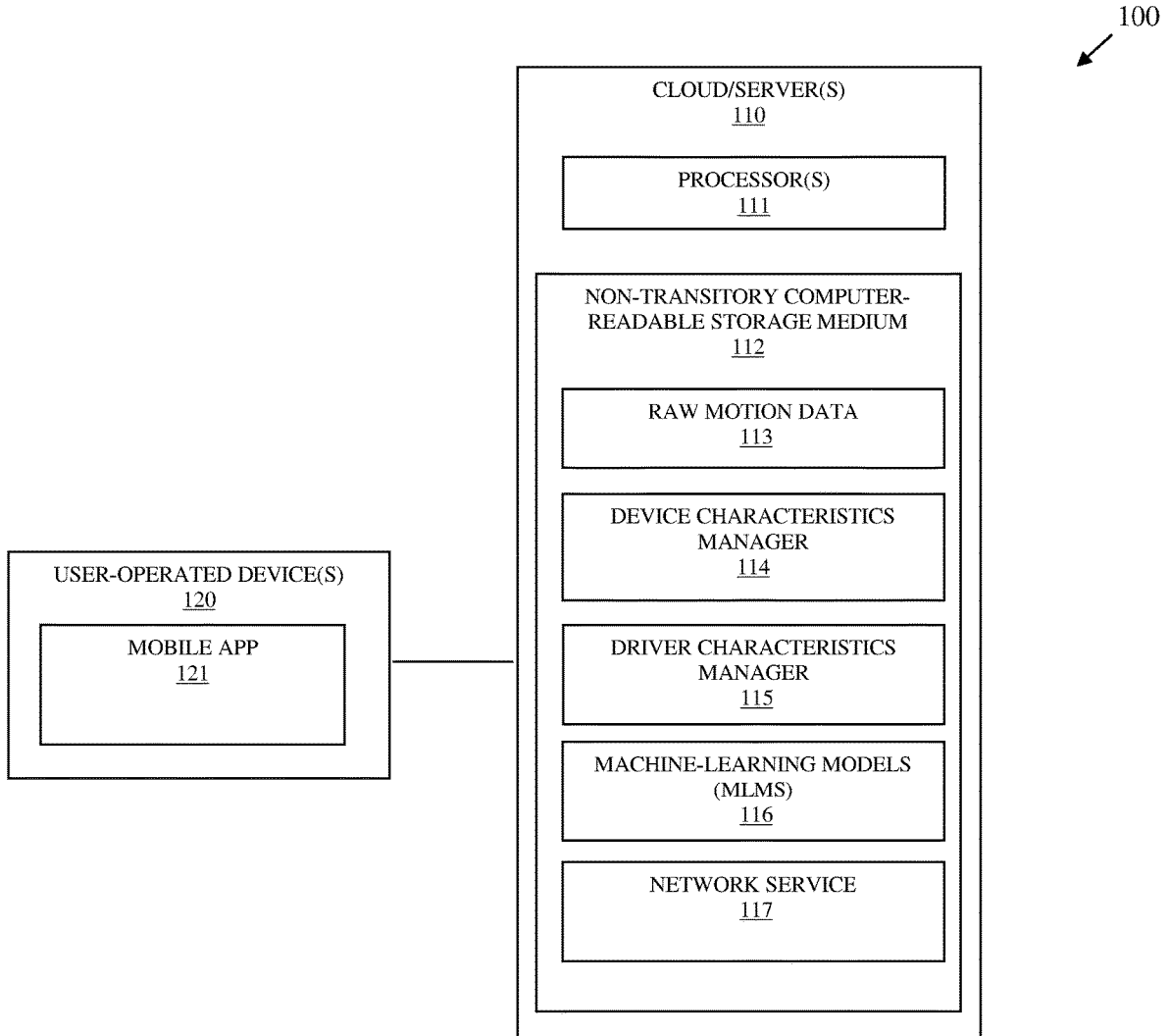
FIG. 1 is a diagram of a system inferring operator characteristics based on device motion data according to an example embodiment.

In various embodiments, methods and a system for inferring operator characteristics for a network-based service are provided. Raw sensor data is collected from operators' mobile devices, such as a phone, a wearable processing device, a tablet, etc. The raw sensor data does not include location data provided for the device by a Global Positioning Satellite (GPS) module, assisted GPS, cell tower services, Wi-Fi location services, or a hybridization of any of the above. Activity data provided by an operating system (OS) of the mobile device is evaluated to identify trips during which the device was determined to be traveling within an automobile vehicle, such as a car, a motorcycle, a bus etc. The raw sensor data associated with each trip is then segmented into data types and processed by multiple different trained machine-learning models (MLMs). The output of the MLMs provide a prediction with respect to the hard braking of the vehicle during a given trip, distracted driving during the trip, and estimated velocity of the vehicle during the trip. The raw data of each trip is further evaluated to determine an estimated duration of the trip, a time of day associated with the trip, and a day of week associated with the trip. Heuristics are processed on each trip's hard braking predicted value, distracted driving predicted value, estimated velocity, duration, time of day, and day of week to assign a characteristic value of a presumed operator of the vehicle during the trip. The characteristic value can then be provided to a network service for purposes of modifying an existing service provided to the operator and/or determining whether to offer a service to the operator.

FIG. 1 is a diagram of a system 100 for inferring operator characteristics based on device motion data, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of inferring operator characteristics based on device motion data, presented herein and below.

As used herein and below, the terms "user," "driver," "insured," and "operator" may be used interchangeably and synonymously. The terms refer to an individual operating or in possession of a user-device and moving with the user-device within a vehicle. A "vehicle" can be a car/automobile, a truck, a bus, a motorcycle, etc.

Traditionally, network-based services rely on location data reported by the user's device. For all the reasons stated above, location data is increasingly becoming harder to obtain for a variety of reasons such as governmental regulations, more awareness by the users, popular public opinion, and privacy concerns. In fact, some OS distributors will periodically request that a user confirm their desire to permit an application to track the user's locations and increasingly consumers are selecting the option for not tracking or selecting the option for allowing tracking but only while the user is actively interacting with the corresponding mobile application on their device.

As will be discussed in detail below, the system 100 infers operator characteristics based on device motion data of a user-device traveling with, in possession of, or being operated by an operator. This is done without direct access to GPS data or location tracking services of the user's device. Currently, this is difficult to achieve in the industry as the industry relies heavily on location data of a user's device.

System 100 captures non-intrusive motion data provided by the device's accelerometer. The accelerometer provides data associated with at least 3 degrees of freedom in Euclidean space. This is data representing the total number of ways that an object (the user's device) can move in three-dimensional space. In an embodiment, raw sensor data also includes gyroscope data from a gyroscope of the user device, such that 6 degrees of freedom in Euclidean space for the user's device is captured. The 6 degrees of freedom include three rotational motions and three linear motions. Each motion centered around one of three axes, two horizontal axes and one vertical axis.

The data associated with the at least 3 degrees of freedom are referred to as heave, surge, and sway. Heave data is a device movement measurement up and down along the vertical axis; surge data is a device movement measurement forwards and backwards along the longitudinal axis; and sway data is a device movement measurement left and right along the lateral axis. In an embodiment, three additional degrees of freedom can be used as provided by a gyroscope associated with the user's device for roll, pitch, and yah; roll data is a device rotation measurement about a longitudinal axis; pitch data is a device rotation measurement about a lateral axis; and yaw data is a device rotation measurement about the vertical axis.

Multiple machine-learning models (MLMs) are trained on the accelerometer data measurements for a trip of a given user's device. After training, the MLMs receive the accelerometer data as input and produce output predicted values representing average estimated speeds of the user's vehicle during trip while in possession of the user's device, hard braking occurrences for the vehicle during the trip with the device in the user's possession, and distracted driving occurrences for the user during the trip while in possession of the device.

A time duration of a user's trip, the time of day for the trip, and the calendar day of the trip are determined from the raw trip data of a given trip. Heuristic rules are then applied to the MLM predicted values and the additional trip metrics are assigned as modified user predicted values for distracted driving, hard braking, and estimated speeds across multiple trips associated with the user. For instance, the number of braking events above a certain threshold for deceleration rate with a certain estimated speed. These user predicted values define user characteristics while driving with the user's device. The user characteristics or user predicted values may then be combined in a score representing the user's driving during the trips evaluated. Alternatively, the user predicted values can be provided to a MLM that outputs a score for the user's driving characteristics during the trips. In an embodiment, the score is a rate of loss that would be experienced by an insurer if the user were to be given a defined rate. For example, a score of 1.5 and a rate of X, would become a target rate to charge the user for a policy of 1.5 X. A score of 0.8 and a rate of X, would become a target rate to charge the user for a policy of 0.8 X.

In the above-noted example, the insurance company provides a rate network service to the user via a mobile application on the user's device. It is noted that any type of company providing any type of service to the user through a corresponding mobile application can be provided the user score for their purposes related to their services. For example, a delivery service that wants to employ or is already employing the user to make deliveries. Other network-based services may also include a ride service, a life insurance service, a bus driving service, any agency or any company that utilizes drivers (emergency medical, policy, fire, utility, etc.).

System 100 includes a cloud 110 or a server 110 (hereinafter just "cloud 110") and one or more user-operated devices 120. Cloud 110 includes one or more processors 111 and non-transitory computer-readable storage/memory 112 (hereinafter just "medium 112"). Medium 112 includes executable instructions for device characteristics manager 114, driver characteristics manager 115, multiple MLMs 116, and a network service 117 (optional), which when executed by processor(s) 111 cause processor(s) 111 to perform operations discussed herein and below with respect to 114-115. Medium 112 also include raw motion data 113 collected from the devices 120 using mobile application 121. Each user-operated device 120 includes a processor and a medium with executable instructions for a mobile application (hereinafter just "app") 121, which when executed by the corresponding processor cause the processor to perform operations discussed herein and below for app 121.

Initially, app 121 stores in a log or a file accelerometer data for device 120 as produced by the accelerometer of device 120. At preconfigured intervals of time or upon a request from device characteristics manager 114, the accelerometer data is obtained on or in a location accessible to cloud 110 where it is retained within medium 113 as the raw motion data.

Device characteristics manager 114 obtains activity data from an operating system (OS) of device 120. The activity data indicates whether the device is in an automobile, walking, running, or, perhaps, biking. This activity data allows manager 114 to identify the begging and the end of a given trip.

Once the raw data 113 is tagged for the starts and ends of each trip using the corresponding device's activity data. Multiple MLMs 116 are trained. A first MLM 116 is trained to estimate speeds during a trip from the raw data 113. This can be done by taking control trips with a device 120 in which the location data or location data services of a control device 120 are turned while the accelerometer data is collected for each control trip. The speeds calculated or obtained from the location data of the device 120 during the trips are labeled as the expected output from a first MLM 116 when provided the corresponding accelerometer data for the corresponding trip. A second MLM 116 is trained to detect hard braking during training trips with actual hard braking events noted using the location data or using noted time stamps during the training trips and provided as expected output from the second MLM 116. A third MLM 116 is trained on distracted driving, this can be done by providing, as expected output, percentages known to be associated with distracted driving for different metrics associated with the training trips. For example, during a training trip a percentage of 70% is assigned when the speed in the training trip is less than 20 mph; a percentage of 80% is assigned when the speed is between 30 and 30 mph; etc. Additionally, the trainer may physically operate the device while driving during the training trips and assign a percentage accordingly. These assigned percentages are time matched to the accelerometer data for the corresponding trips and labeled as the expected output from the third MLM 116.

Once the at least three MLMs 116 have an acceptable level of accuracy or F1 value, system 100 is operational to provide a user driving characteristic score for use by network service 117 in providing a service to the user. The raw data 113 is collected when requested by manager 114 or at predefined intervals of time and manager 114 preprocesses the raw motion data 113 to insert start trip tags and end trip tags in the corresponding raw data 113. Device characteristics manager 113 then identifies a duration of each trip based on a time and date stamp in the raw data 113 where the trip starts and a time and date stamp in the raw data 113 where the trip ends. Manager 113 also identifies a calendar date for each trip and a time of day for each trip using the time and date stamps associated with the raw data 113.

Driver characteristics manager 115 passes the raw data associated with each trip as input to each of the 3 trained MLMs 116. The first MLM 116 returns estimated speeds of the vehicle as experienced through the device 120 as output for each trip. The second MLM 116 returns an estimated number of hard brakes during the trip and duration of each hard brake as output for each trip. The third MLM 116 returns percentages of distracted driving during each trip.

Driver characteristics manager 115 then evaluates each trip and its predicted values in view of predefined heuristic rules to assign a modified value for at least four factors of each trip. The four factors are estimated speed, distracted driving, hard braking, and estimated distance of travel or duration of driving for each trip. The estimated distance may be calculated using a known duration for a trip and the estimated speeds predicted by the first MLM 116 for the trip.

The modified values associated with the four factors for more than one trip of the user are then combined to produce an overall user driving characteristic value. In an embodiment, the overall user driving characteristic value is produced via a fourth MLM 116 trained on known rate loss experienced by a network service 117 for the user over a given period of time. The rate loss is labeled as expected output of the fourth MLM 116 when provided the four factor values as input to the MLM 116.

A final user driving characteristic value is provided to network service 117 for use in determining whether to offer a given service to the user, decline to offer the service, or modify terms of an existing service provided to the user.

In an embodiment, the network service 117 is a car insurance service that provides insurance to a user and provides access to the user's policy, profile, coverage, and history via app 121. In an embodiment the user driving characteristic value is a rate of loss value based on a current or proposed rate for a given coverage of insurance.

In an embodiment, device 120 is a phone, tablet, or wearable processing device.

In an embodiment, device characteristics manager 114 identifies the type of device 120 and parses the raw data 113 to label the types of accelerometer data based on the device type. For example, the types and location of types of data in raw data obtained from an iOS® device 120 is different from an Android® device 120. Manger 114 uses different sets of parsing rules based on the device type of the device 121.

In an embodiment, network service 117 is external to cloud 110 and provided to app 121 via a separate server or a separate cloud. Manager 115 provides an overall driving characteristic value to network service 117 via an Application Programming Interface (API).

In an embodiment, each raw set of trip data is filtered through one or more algorithms that determine whether it was the user that was driving during the trip of not the user. Any filtered algorithm that determines the user was not the driver during a trip causes the corresponding trip data to be removed from the raw data 113. For example, the raw accelerometer data can indicate the user is exclusively operating the device 120 and the device 120 appears to be held firmly in the hands of the user and not in a pocket, purse, bag, seat, or cup holder. Under such conditions, an assumption can be made that based on the corresponding accelerometer data that the user was not the driver for the corresponding trip data.

System 100 permits evaluating driver characteristics without using location data associated with a device's GPS or location services. This is achieved using the raw data 113 preprocessed by manager 114 and labeled with data types for accelerometer data types of heave, sway, and surge (optionally the data types are identified based on the device type for the device 120) within the raw data 113. In an embodiment, data types associated with a gyroscope of the user's device is labeled for data types associated with three additional motions for pitch data types, roll data types, and yaw data types. Activity data reported by an OS of the device allows trips to be identified during which the device 120 was in an automobile or vehicle. A duration, time of day, and calendar day is identified for each trip. The preprocessed raw trip data is passed as input to at least three MLMs 116. The first MLM 116 predicts estimated speeds experienced by device 120 during each trip. The second MLM 116 predicts a number of hard brakes experienced by device 120 and a degree of each hard brake. The third MLM 116 predicts the extent or percentage to which the user was distracted while driving the vehicle during each trip. The predicted values are then modified based on predefined heuristics as modified factor values. The modified factor values are then combined to provide an objective overall value representing the user's driving characteristics. In an embodiment, the objective overall value is provided by a fourth MLM 116. In an embodiment, the objective overall value is a rate of loss for insuring the user for any given policy of defined coverage.

System 100 does not rely on location data and is therefore unaffected by the movement away from obtaining user location data from a user and the user's device. The above-referenced embodiments and other embodiments are now discussed with reference to FIGS. 2-3.

FIG. 2 is a diagram of a method 200 for inferring operator characteristics for a network-based service, according to an example embodiment. The software module(s) that implements the method 300 is referred to as a "driver characteristic profiler." The driver characteristic profiler is implemented as executable instructions programmed and residing within memory and/or a non-transitory computer-readable (processor-readable) storage medium and executed by one or more processors of a device. The processor(s) of the device that executes the driver characteristic profiler are specifically configured and programmed to process the driver characteristic profiler. The driver characteristic profiler may or may not have access to one or more network connections during its processing. The network connections can be wired, wireless, or a combination of wired and wireless.

In an embodiment, the device that executes the driver characteristic profiler is the cloud 110. In an embodiment, the device that executes the driver characteristic profiler is server 110.

In an embodiment, the driver characteristic profiler is all or some combination of 114, 115, 116, and/or 117. The driver characteristic profiler presents another and, in some ways, enhanced perspective of system 100.

At 210, the driver characteristic profiler receives accelerometer data from a device 120. The accelerometer data comprises values associated with the device's movement in at least three directions associated with sway values, heave values, and surge values. In an embodiment three additional directions provided by the device's gyroscope can be used with the sensor data for roll values, pitch values, and yaw values. In an embodiment, the activity data provided by the OS may also be integrated into the corresponding sensor data.

In an embodiment, at 211, the driver characteristic profiler requests the accelerometer data (hereinafter just "data") at predefined intervals of time from the device. This is a specific request or pull request. In an embodiment, at 212, the driver characteristic profiler obtains the data at predefined intervals of time from an application 121 of the device 120. This is a push from the application 121 to the driver characteristic profiler.

At 220, the driver characteristic profiler identifies a trip in which the device 120 was in a vehicle traveling from the data. This is done using the OS activity data reported by the OS of device 120, which identifies when the device 120 is in an automobile, walking, running, perhaps biking, and idle. It is noted that other techniques may be used as well to identify the trip from the data.

At 230, the driver characteristic profiler derives driving characteristics for the user who is in possession of the device 120 during the trip. In an embodiment, filtering algorithms are processed to determine whether the user was the actual driver or was just a passenger in the vehicle and when the user was a passenger the corresponding trip data is excluded and another trip for which the user was considered a driver is identified from the data.

In an embodiment, at 231, the driver characteristic profiler identifies a time of day, a calendar date, and a duration for the trip from the data. In an embodiment of 231 and at 232, the driver characteristic profiler determines estimated speeds, hard braking, and distracted driving values from the data. In an embodiment of 232 and at 233, the driver characteristic profiler obtains the values from MLMs 116 when the MLMs 116 are provided the data associated with the trip as input. In an embodiment of 233 and at 234, the driver characteristic profiler modifies the values based on the time of day, the calendar date, the duration, and heuristics to produce modified values.

At 240, the driver characteristic profiler determines a driver characteristic value from the user based at least on the driving characteristics. This is done without using any location data or location services associated with the device 120.

In an embodiment of 234 and 240, at 241, the driver characteristic profiler provides the modified values as input to an additional MLM 116 and receives the driver characteristic value as output from the additional MLM 116.

In an embodiment, at 250, the driver characteristic profiler provides the driver characteristic value to a network-based service 117. The network-based service 117 is provided to the user through an application 121 on the device 120.

In an embodiment, at 260, the driver characteristic profiler iterates to 210 for a second trip, derives second driving characteristics for the second trip, and updates the driver characteristic value based on the driving characteristics of the trip and the second driving characteristics of the second trip.

FIG. 3 is a diagram of another method 300 for inferring operator characteristics for a network-based service, according to an example embodiment. The software module(s) that implements the method 300 is referred to as a "driver evaluator." The driver evaluator is implemented as executable instructions programmed and residing within memory and/or a non-transitory computer-readable (processor-readable) storage medium and executed by one or more processors of a device. The processors that execute the driver evaluator are specifically configured and programmed to process the driver evaluator. The driver evaluator may have access to one or more network connections during its processing. The network connections can be wired, wireless, or a combination of wired and wireless.

In an embodiment, the device that executes the driver evaluator is the cloud 110. In an embodiment, the device that executes the driver evaluator is server 110.

In an embodiment, the driver evaluator is all of, or some combination of 114, 115, 116, 117, and/or method 200.

The driver evaluator presents another and, in some ways, enhanced processing perspective of system 100 and/or method 200.

At 310, the driver evaluator trains MLMs 116 on location data of training devices that are traveling in a training vehicle to predict values. The values are associated with speed, distracted driving, and hard braking. During training, the MLMs 116 are provided accelerometer data for the training devices as input for the training trips and provided actual values calculated using at least the location data as the expected output.

In an embodiment, at 311, the driver evaluator preprocesses the data before training based on a type of OS associated with each of the training devices. This is because different OSs may format their accelerometer data differently and may express the sway, surge, and heave values differently. By preprocessing the data, the MLMs 116 receive a consisted set of input data during training.

At 320, the driver evaluator obtains accelerometer data for a device 120 associated with a driver (user). The raw data may be preprocessed based on a type of device as discussed above in embodiment 311.

At 330, the driver evaluator identifies trips from OS-reported activity data during which the device 120 was in a vehicle driven by the driver. Again, a variety of filtering algorithms can be processed to exclude any trip set of data for which it can be determined that the driver was actually a passenger in the vehicle.

At 340, the driver evaluator assigns a time of day, a calendar date, and a trip during to each trip. This data is time stamped in the accelerometer data and is appropriately assigned to each trip.

At 350, the driver evaluator provides the data for each trip as input to the MLMs 116. The driver evaluator receives trip predicted values for speed, distracted driving, and hard braking for each trip.

At 360, the driver evaluator determines a driver characteristic value for the driver from at least the corresponding time of day, calendar date, trip duration, and trip predicted values. Heuristics may also be used to determine the driver characteristic value.

In an embodiment, at 370, the driver evaluator provides the driver characteristic value to a network-based service 117. The network-based service 117 is provided to the driver through a mobile application 121 of the device 120.

In an embodiment, at 380, the driver evaluator iterates to 320 and updated the accelerometer data for the driver and additional trips at predefined intervals of time.

In an embodiment, at 390, the driver evaluator provides the driver characteristic value as a rate of loss value to an insurance service 117 associated with providing a driving insurance policy to the driver. In an embodiment of 390 and at 391, the driver evaluator updates the driver characteristic value at a policy renewal period associated with the driving insurance by iterating to 320 to obtain updated data for additional trips of the driver.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving accelerometer data from a device;

identifying a trip in which the device was in a vehicle traveling from activity data reported by an operating system (OS) of the device;

deriving driving characteristics for a user in possession of the device during the trip; and determining a driver characteristic value for the user based on the driving characteristics, without using any location data associated with the device;

wherein determining further comprises:

processing filtering algorithms to determined whether the user was an actual driver or was just a passenger in the vehicle and when the user was a passenger corresponding trip data is excluded and another trip for which the user was considered a driver is identified from the accelerometer data;

modifying predicted values for estimated speeds, hard braking, and distracted driving based on a time of day, a calendar date, a duration of the trip, and heuristics to produce modified values; and providing the modified values as input to a machine-learning model (MLM) and receiving the driver characteristic value as output from the MLM;

wherein the driver characteristic value is a rate of loss that insures the user for any given policy of defined coverage.

2. The method of claim 1 further comprising, providing the driver characteristic value to a network-based service provided to the user through an application on the device.

3. The method of claim 1 further comprising, iterating to the receiving for a second trip, deriving second driving characteristics for the second trip, and updating the driver characteristic value based on the driving characteristics of the trip and the second driving characteristics of the second trip.

4. The method of claim 1, wherein receiving further includes requesting the accelerometer data at predefined intervals of time from the device.

5. The method of claim 1, wherein receiving further includes obtaining the accelerometer data at predefined intervals from an application on the device.

6. The method of claim 1, wherein identifying further includes segmenting the activity data into the trip and other trips.

7. The method of claim 1, wherein deriving further includes identifying a time of day, a calendar date, and a duration for the trip from the accelerometer data or the activity data.

8. The method of claim 7, wherein deriving further includes determining estimated speeds, hard braking, and distracted driving values from the accelerometer data.

9. The method of claim 8, wherein determining the estimated speeds further includes obtaining the estimated speeds, hard braking, and distracted driving values from additional MLMs when providing the accelerometer data associated with the trip as input to the additional MLMs.

10. A method, comprising:

training machine-learning models (MLMs) on location data of training devices that are traveling in a training vehicle to predict values for speed, distracted driving, and hard braking using accelerometer data for the training devices as input to the MLMs for training trips taken by the training vehicle with the training devices;

obtaining accelerometer data for a device associated with a driver;

identifying trips from activity data provided by an operating system (OS) of the device during which the device was in a vehicle driven by the driver;

assigning a time of day, a calendar date, and a trip duration to each trip;

providing the accelerometer data for each trip as input the MLMs and receiving trip predicted values for speed, distracted driving, and hard braking; and determining a driver characteristic value for the driver from a corresponding time of day, a corresponding calendar date, a corresponding trip duration, and a corresponding trip predicted values;

wherein determining further comprises:

preprocessing the accelerometer data before the training based on a type of operating system associated with each of the training devices;

modifying the corresponding trip predicted values based on predefined heuristic rules to assign modified values for at least four factors of each trip, wherein the at least four factors comprise estimated speed, distracted driving, hard braking, and estimated distance of travel or duration of driving for each trip, and providing the modified values as input to an additional machine-learning model (MLM) that outputs the driver characteristic value;

wherein the driver characteristic value is a rate of loss that insures a user for any given policy of defined coverage.

11. The method of claim 10 further comprising, providing the driver characteristic value to a network-based service that is provided to the driver through a mobile application of the device.

12. The method of claim 10 further comprising, iterating to the obtaining and updating the accelerometer data for the driver at predefined intervals of time.

13. The method of claim 10 further comprising, providing the driver characteristic value as a rate of loss for an insurance service associated with providing a driving insurance policy to the driver.

14. The method of claim 13, wherein providing the rate of loss further includes updating the driver characteristic value at a policy renewal period by iterating to the obtaining to obtain updated accelerometer data for the driver.

15. The method of claim 10, wherein training further includes preprocessing the accelerometer data for the training devices based on a type of the OS associated with each of the training devices.

16. A system, comprising:

at least one server system comprising at least one server having at least one processor and a non-transitory computer-readable storage medium having executable instructions representing driver characteristic profiler;

the driver characteristic profiler when executed by the at least one processor from the non-transitory computer-readable storage medium causes the at least one processor to perform operations comprising:

training machine-learning models (MLMs) to use accelerometer data as input to predict values for a training device traveling in a vehicle during training trips, wherein the values comprise predicted values for vehicle speed, hard braking, and distracted driving during the training trips, wherein actual values for the vehicle speed, hard braking, and distracted driving are obtained during the training from location data associated with the training device;

obtaining accelerometer data for a device of a user;

identifying a trip of the user during which the user is driving a user vehicle with the device;

providing the accelerometer data for the trip to the MLMs as input;

receiving as output from trip predicted values for speed, hard braking, and distracted driving during the trip;

calculating an overall driver characteristic value from at least the trip predicted values;

wherein calculating further comprises:

preprocessing the accelerometer data based on a type of an operating system associated with the device;

modifying the trip predicted values based on a time of day, a calendar date, and a duration of the trip to produce modified factor values; and providing the modified factor values as input to an additional MLM that outputs the overall driver characteristic value; and providing the overall driver characteristic value to a network-based service to evaluate driving characteristics of the user for purposes of providing the user a service through a mobile application of the device;

wherein the overall driver characteristic value is a rate of loss that insures the user for any given policy of defined coverage.

17. The system of claim 16, wherein the device is a phone or a tablet that is in possession of the user during the trip.

18. The system of claim 16, wherein the operations associated with the calculating further include:

identifying the time of day, the calendar date, and the duration of the trip from the accelerometer data;

calculating a distance traveled during the trip from the trip predicted values associated with the speed and the duration of the trip; and calculating the overall driver characteristic value based on the trip predicted values, the time of day, the calendar date, the duration, and the distance traveled.

* * * * *